United States Patent
Wang

(10) Patent No.: US 10,148,173 B1
(45) Date of Patent: Dec. 4, 2018

(54) VOLTAGE REGULATOR AND CONTROL METHOD

(71) Applicant: Wistron Corporation, New Taipei (TW)

(72) Inventor: Wen-Chin Wang, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 15/786,609

(22) Filed: Oct. 18, 2017

(30) Foreign Application Priority Data

Jun. 6, 2017 (TW) .............................. 106118624 A

(51) Int. Cl.
| | |
|---|---|
| *H02M 3/156* | (2006.01) |
| *H02M 1/088* | (2006.01) |
| *G06F 1/32* | (2006.01) |
| *G05F 1/575* | (2006.01) |

(52) U.S. Cl.
CPC ............ *H02M 3/156* (2013.01); *G05F 1/575* (2013.01); *G06F 1/3203* (2013.01); *H02M 1/088* (2013.01)

(58) Field of Classification Search
CPC .... H02M 3/156–3/158; H02M 3/1582; H02M 3/1584; H02M 1/088; G05F 1/575; G06F 1/3203
USPC ................................................. 323/271–285
See application file for complete search history.

(56) References Cited

U.S. PATENT DOCUMENTS

| | | | | |
|---|---|---|---|---|
| 4,410,794 A | * | 10/1983 | Williams .............. | B64D 15/14 219/201 |
| 7,579,842 B2 | * | 8/2009 | Hunter .................. | H02J 7/0019 320/103 |
| 8,274,265 B1 | * | 9/2012 | Khanna ............... | H02M 3/1584 323/225 |
| 2012/0043889 A1 | * | 2/2012 | Recker ............... | H05B 33/0815 315/86 |

FOREIGN PATENT DOCUMENTS

TW 201010235 3/2010

* cited by examiner

*Primary Examiner* — Yemane Mehari
(74) *Attorney, Agent, or Firm* — Winston Hsu

(57) ABSTRACT

A voltage regulator is disclosed. The voltage regulator includes a plurality of energy storage modules, a voltage converter for converting an input voltage into a charging voltage, a time-sharing controller for generating a select signal, and a de-mux coupled to the plurality of energy storage modules, the voltage converter and the time-sharing controller, to sequentially conduct the connections between the voltage converter and each energy storage module of the plurality of energy storage modules according to the select signal, to charge each energy storage module of the plurality of energy storage modules with the charging voltage, and each energy storage module of the plurality of energy storage modules generate a plurality of output voltages after finishing charging.

9 Claims, 5 Drawing Sheets

VOLTAGE REGULATOR AND CONTROL METHOD

BACKGROUND OF THE INVENTION

1. Field of the Invention

This present invention relates to a voltage regulator and a control method, and more specifically, to a voltage regulator and a control method for providing multiple output voltages.

2. Description of the Prior Art

Different chips in a computer device are usually driven by different driving voltages; therefore, multiple voltage regulators or low drop regulators (LDO) are required for respectively supplying different voltages, such as 1.1V, 1.5V, 1.8V, 3.3V, etc. Under such a circumstance, since the voltage regulators or LDOs further occupy different signal paths and include different circuit components, and the computer device or the chips consume different amounts of current corresponding to the different voltages, different voltage regulators are set separately at different positions on a Printed Circuit Board (PCB), which further leads to raise of the chip area.

Therefore, how to provide different voltage sources for the computer device or the chips while efficiently making use of the area of the PCB has become a significant objective in the field.

SUMMARY OF THE INVENTION

It is therefore a primary objective of the present invention to provide a voltage regulator and a control method for providing multiple output voltages to improve over the prior art.

The present invention discloses a voltage regulator, comprising a plurality of energy storage modules; a voltage converter, for converting an input voltage into a charging voltage; a time sharing controller, for generating a select signal; and a de-multiplexer, coupled to the plurality of energy storage modules, the voltage converter and the time sharing controller, for sequentially conducting connections between each energy storage module of the plurality of energy storage modules and the voltage converter according to the select signal, to charge each energy storage module of the plurality of energy storage modules with the charging voltage, so as to generate the plurality of output voltages via the plurality of energy storage modules after charging each energy storage module of the plurality of energy storage modules is complete.

The present invention further discloses a control method, for a voltage regulator comprising a plurality of energy storage modules, the control method comprising converting an input voltage into a charging voltage; and sequentially outputting the charging voltage to each energy storage module of the plurality of energy storage modules, to charge each energy storage module of the plurality of energy storage modules, so as to generate a plurality of output voltages after charging each energy storage module of the plurality of energy storage modules is complete.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
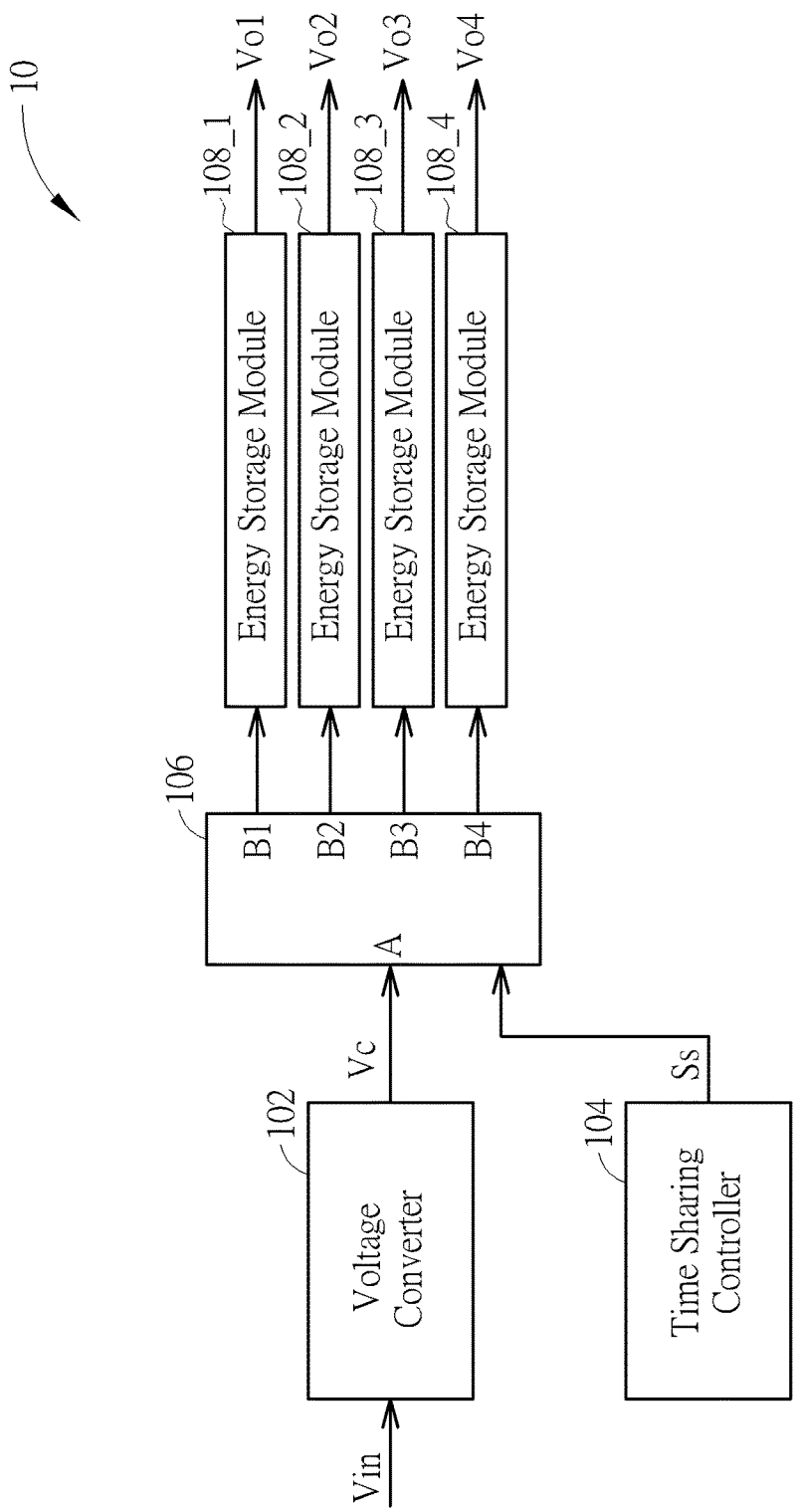
FIG. 1 is a schematic diagram of a voltage regulator according to an embodiment of the present invention.

Please refer to FIG. 1, which is a schematic diagram of a voltage regulator 10 according to an embodiment of the present invention. The voltage regulator 10 may be utilized for providing power sources required by a computer device or chips. The voltage regulator 10 includes a voltage converter 102, a time sharing controller 104, a de-multiplexer 106, and energy storage modules 108_1-108_4. The voltage converter 102 is utilized for converting an input voltage Vin into a charging voltage Vc to charge energy storage modules 108_1-108_4. The time sharing controller 104 is coupled to the de-multiplexer 106, for generating a select signal Ss to instruct the de-multiplexer 106 to conduct the connections between each of the energy storage modules 108_1-108_4 and the voltage converter 102. The de-multiplexer 106 is coupled to the voltage converter 102, the time sharing controller 104 and the energy storage modules 108_1-108_4, and utilized for sequentially conducting the connections between each of the energy storage modules 108_1-108_4 and the voltage converter 102 according to the select signal Ss, so as to charge each of the energy storage modules 108_1-108_4 with the charging voltage Vc generated by the voltage converter 102. The energy storage modules 108_1-108_4 generate corresponding output voltages Vo1-Vo4 after the energy storage modules 108_1-108_4 are completely charged. As a result, after the voltage regulator 10 sequentially charges the energy storage modules 108_1-108_4 via the voltage converter 102 and the time sharing controller 104, the voltage regulator 10 is able to stably provide the output voltages Vo1-Vo4 required by the system.

In detail, the voltage converter 102 may be a boost/bulk controller for converting the input voltage Vin into the charging voltage Vc, and deliver the charging voltage Vc to the de-multiplexer 106. The select signal Ss generated by the time sharing controller 104 is related to at least one of a conducting sequence and a conducting duration of the energy storage modules 108_1-108_4. The de-multiplexer 106 conducts the connections between the voltage converter 102 and the energy storage modules 108_1-108_4 according to the conducting sequence and the conducting duration of the select signal Ss. For example, when the select signal Ss instructs conducting the connection between the voltage converter 102 and the energy storage module 108_2, the de-multiplexer 106 conducts the connection A-B2. Notably, the amount of the energy storage modules 108_1-108_4 in FIG. 1 is 4, which is for illustrative purposes. As a matter of fact, the amount of the energy storage modules is not limited herein and may be increased or decreased according to the requirements of the computer device or components. In addition, each of the energy storage modules 108_1-108_4 may be made by a capacitor, an inductor or any other device that stores electricity energy, so as to store the charging voltage Vc provided by the voltage converter 102 when the de-multiplexer 106 conducts the corresponding connection between the voltage converter 102 and each of the energy storage modules 108_1-108_4. Therefore, the voltage regulator 10 uses the time sharing controller 104 to sequentially instruct the de-multiplexer 106 to conduct the energy storage modules 108_1-108_4, so as to simultaneously output different output voltages Vo1-Vo4 corresponding to the energy storage modules 108_1-108_4 after charging the energy storage modules 108_1-108_4 is complete.

In brief, the voltage regulator 10 of the present invention sequentially conducts the connections between each of the energy storage module 108_1-108_4 and the voltage converter 102 according to the select signal Ss of the time sharing controller 104, and stably provide multiple and different output voltages at the same time after the charging process is complete. In other words, the voltage regulator 10 charges each of the energy storage module 108_1-108_4 and outputs different output voltages via the energy storage modules 108_1-108_4 after the charging process is complete. Therefore, the voltage regulator 10 of the present invention is able to provide multiple and different output voltages at the same time for different devices of the computer system.

Figure 2:
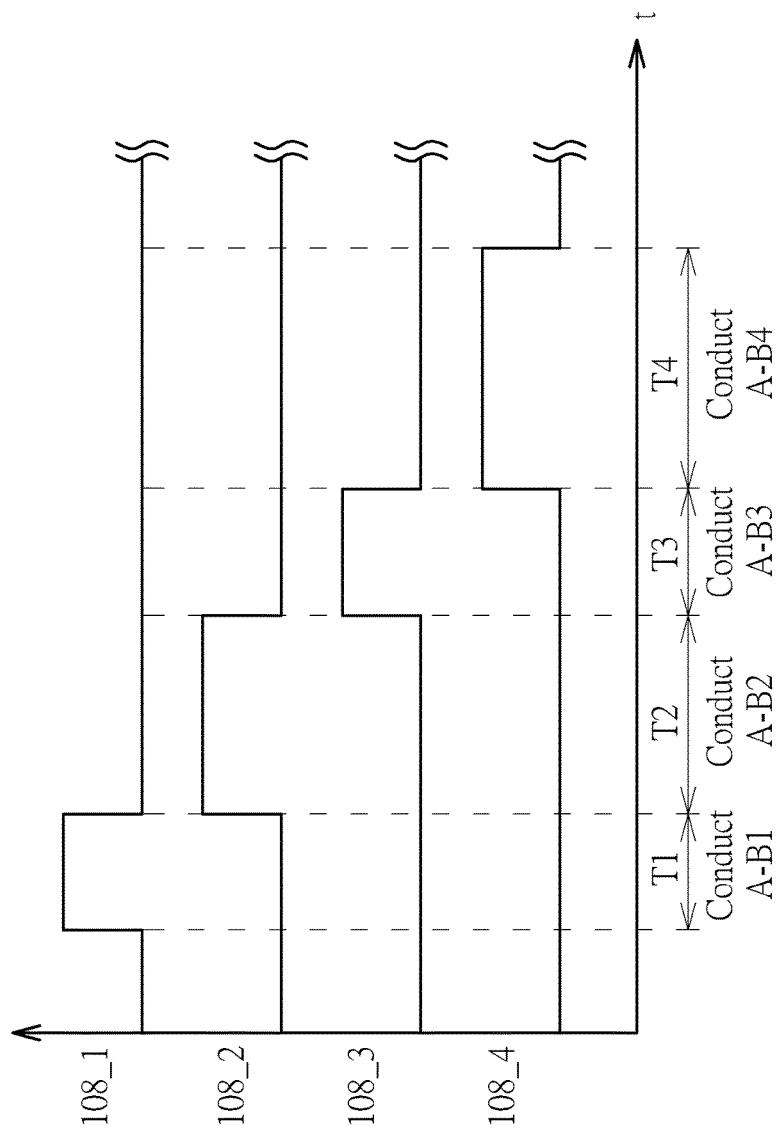
FIG. 2 is a signal timing diagram of the voltage regulator in FIG. 1.
Figure 3:
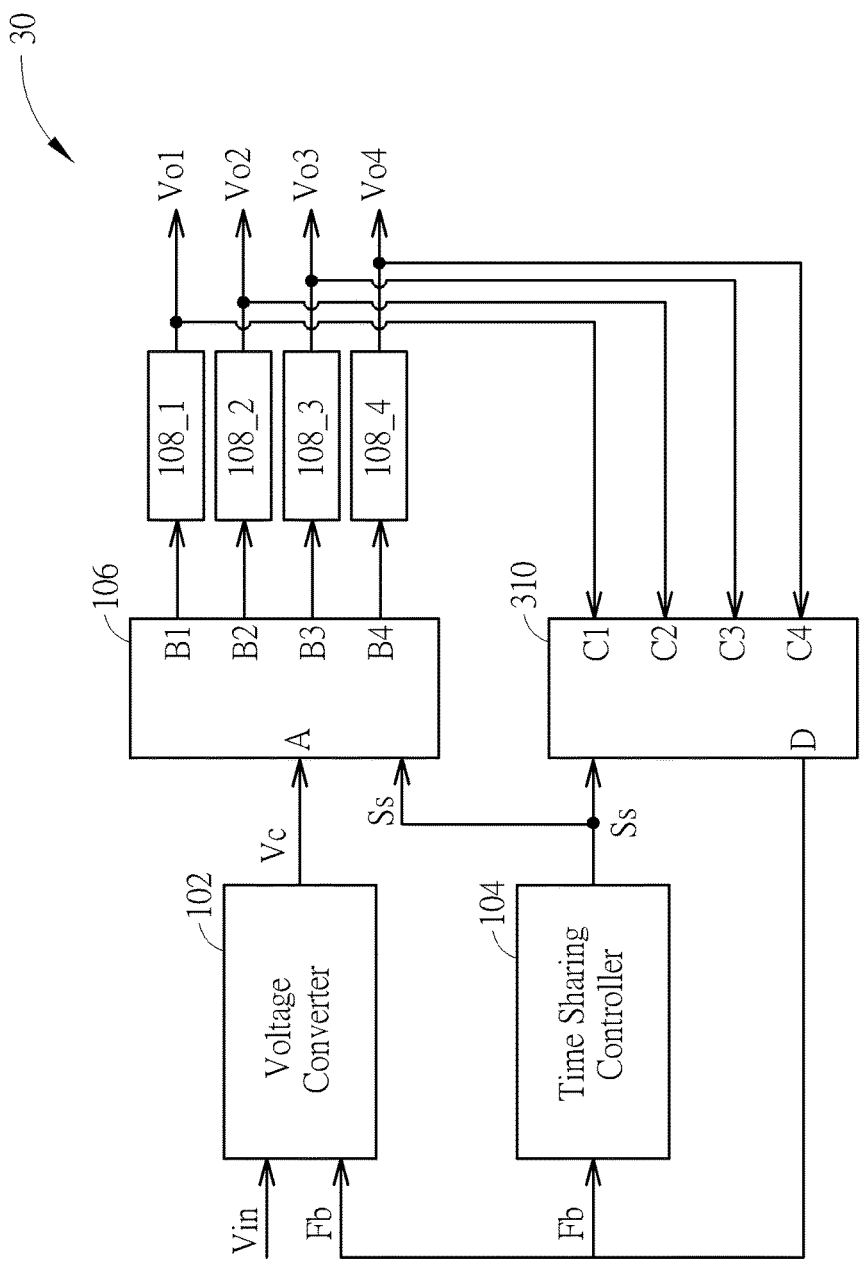
FIG. 3 is another schematic diagram of a voltage regulator according to an embodiment of the present invention.

Furthermore, the select signal Ss generated by the time sharing controller 104 of the voltage regulator 10 may inform the de-multiplexer 106 about the conducting sequence and the conducting durations of the energy storage modules 108_1-108_4. In other words, the de-multiplexer 106 sequentially conducts the connections between the voltage converter 102 and each of the energy storage modules 108_1-108_4 according to a certain sequence and duration. For example, please refer to FIG. 2, which is a signal timing diagram of the voltage regulator 10 in FIG. 1. When the select signal Ss generated by the time sharing controller 104 instructs conducting the connection between the voltage converter 102 and the energy storage module 108_1, the de-multiplexer 106 conducts the connection A-B1. Therefore, within a first conducting duration T1, the voltage converter 102 charges the energy storage module 108_1. Next, when the select signal Ss generated by the time sharing controller 104 instructs conducting the connection between the voltage converter 102 and energy storage module 108_2, the de-multiplexer 106 conducts the connection A-B2. Therefore, within a second conducting duration T2, the voltage converter 102 charges the energy storage module 108_2. By the same token, within a third conducting duration T3 and a fourth conducting duration T4, the de-multiplexer 106 conducts the connection A-B3 and the connection A-B4 respectively, which allows the voltage converter 102 to charge the energy storage module 108_3 and the energy storage module 108_4 respectively. As a result, after the charging voltage Vc of the voltage converter 102 completes the charging of each of the energy storage modules 108_1-108_4, each of the energy storage modules 108_1-108_4 of the voltage regulator 10 is able to stably output different output voltages Vo1-Vo4 at the same time. Notably, as shown in FIG. 3, the conducting durations of the energy storage modules 108_1-108_4 do not overlap and the conducting durations of the energy storage modules 108_1-108_4 are not completely the same (i.e. T1, T2, T3 and T4 are not completely the same). Moreover, the conducting durations may be varied according to capacities of the energy storage modules and circuit components or adjusted by a user or the computer system, and is not limited herein, which is within the scope of the present invention.

The examples mentioned above are conceptually illustrating that the present invention uses the select signal Ss of the time sharing controller 104 to sequentially instruct the de-multiplexer 106 to conduct the connections between the voltage converter 102 and each of the energy storage modules 108_1-108_4, so as to provide different output voltages at the same time via the energy storage modules 108_1-108_4 after charging the energy storage modules 108_1-108_4 is complete. Notably, those skilled in the art may make modifications and alterations to design the voltage regulator 10 properly according to different system requirements. For example, according to the requirements of different computer devices, the amount, the charging sequence, or the conducting durations of the energy storage modules may be adaptively adjusted, which is not limited herein.

In another embodiment, please refer to FIG. 3, which is another schematic diagram of a voltage regulator 30 according to an embodiment of the present invention. The components of the voltage regulator 30 are similar to those of the voltage regulator 10, such that the same elements are denoted by the same symbols for simplicity. The difference between the voltage regulator 30 and the voltage regulator 10 is that the voltage regulator 30 further includes a multiplexer 310 coupled to the energy storage modules 108_1-108_4 and the time sharing controller 104. The multiplexer 310 is utilized for sequentially conducting the connections between the energy storage modules 108_1-108_4 and the voltage converter 102 according to the select signal Ss, and sequentially converting the output voltages Vo1-Vo4 outputted by the energy storage modules 108_1-108_4 into a feedback signal Fb for the time sharing controller 104 and the voltage converter 102 to form a voltage regulating loop. Correspondingly, the time sharing controller 104 may adjust the conducting durations between the energy storage modules 108_1-108_4 and the voltage converter 102 in the select signal Ss according to the feedback signal Fb corresponding to the output voltages Vo1-Vo4. For example, after the energy storage module 108_3 stores enough electricity, the time sharing controller 104 delivers the select signal Ss which conducts the connection between the energy storage module 108_4 and the voltage converter 102. Then, after conducting the connection A-B4 via the de-multiplexer 106 and conducting the connection C4-D via the multiplexer 310 to simultaneously convert the output voltage Vo4 of the energy storage module 108_4 into the feedback signal Fb via the multiplexer 310, the feedback signal Fb is delivered to the time sharing controller 104 and the voltage converter 102 to form the voltage regulating loop. The time sharing controller 104 may accordingly determine whether to extend or shorten the conducting duration.

Figure 4:
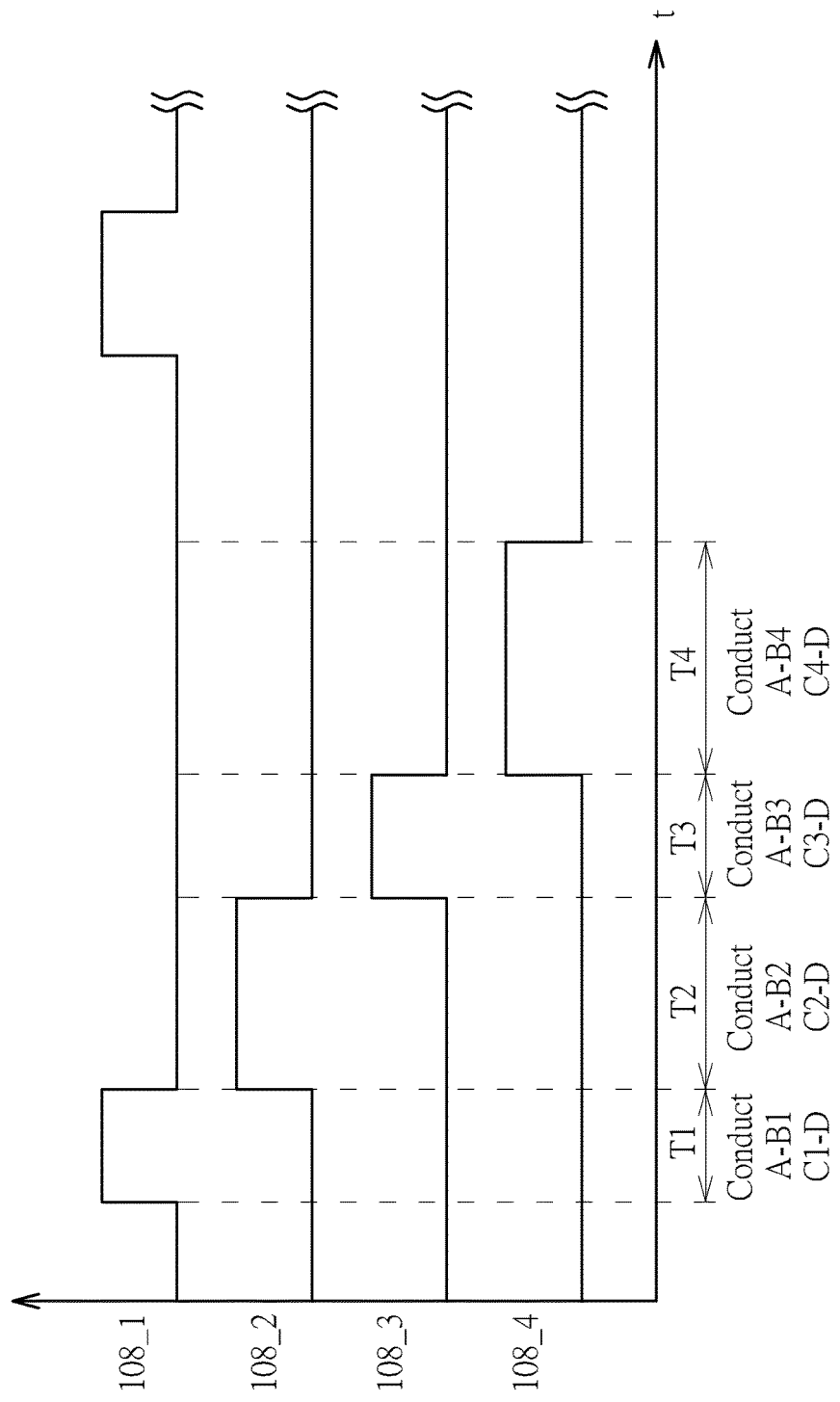
FIG. 4 is a signal timing diagram of the voltage regulator in FIG. 3.

Furthermore, please refer to FIG. 4, which is a signal timing diagram of the voltage regulator 30 shown in FIG. 3. When the select signal Ss generated by the time sharing controller 104 instructs the de-multiplexer 106 and the multiplexer 310 to conduct the connection between the voltage converter 102 and the energy storage module 108_1, the de-multiplexer 106 conducts the connection A-B1 and the multiplexer 310 conducts the connection C1-D. Therefore, within the first conducting duration T1, the voltage converter 102 charges the energy storage module 108_1 via the de-multiplexer 106. At the same time, the multiplexer 310 converts the output voltage Vo1 of the energy storage module 108_1 into the feedback signal Fb and delivers the feedback signal Fb to the time sharing controller 104 and the voltage converter 102 to form the voltage regulating loop. Then, when the select signal Ss generated by the time sharing controller 104 instructs conducting the connection between the voltage converter 102 and the energy storage module 108_2, the de-multiplexer 106 conducts the connection A-B2 and the multiplexer 310 conducts the connection C2-D. Therefore, within the second conducting duration T2, the voltage converter 102 charges the energy storage module 108_2 via the de-multiplexer 106. At the same time, the multiplexer 310 converts the output voltage Vo2 of the energy storage module 108_2 into the feedback signal Fb and delivers the feedback signal Fb to the time sharing controller 104 and the voltage converter 102 to form the voltage regulating loop. By the same token, within the third conducting duration T3 and the fourth conducting duration T4, the de-multiplexer 106 respectively conducts the connection A-B3 and the connection A-B4, and the multiplexer 310 respectively conducts the connection C3-D and the connection C4-D, so as to respectively charge the energy storage module 108_3 and the energy storage module 108_4 via the voltage converter 102. And, after the output voltage Vo3 of the energy storage module 108_3 and the output voltage Vo4 of the energy storage module 108_3 are converted into the feedback signal Fb, the feedback signal Fb is delivered to the time sharing controller 104 and the voltage converter 102. As a result, when the voltage converter 102 finishes charging each of energy storage modules 108_1-108_4 via the de-multiplexer 106, each of the energy storage modules 108_1-108_4 of the voltage regulator 30 is able to stably output multiple and different output voltages Vo1-Vo4, and the multiplexer 310 delivers the feedback signal Fb to the time sharing controller 104 and the voltage converter 102 to form the voltage regulating loop. Notably, as shown in FIG. 4, the conducting durations of the energy storage modules 108_1-108_4 do not overlap, and the conducting durations of the energy storage modules 108_1-108_4 are not completely the same (i.e. T1, T2, T3 and T4 are not completely the same) and may be varied according to the change of the energy storage capacities of the energy storage modules and the circuit components, or adjusted by the user or the computer system, which is within the scope of the present invention and not limited herein.

Figure 5:
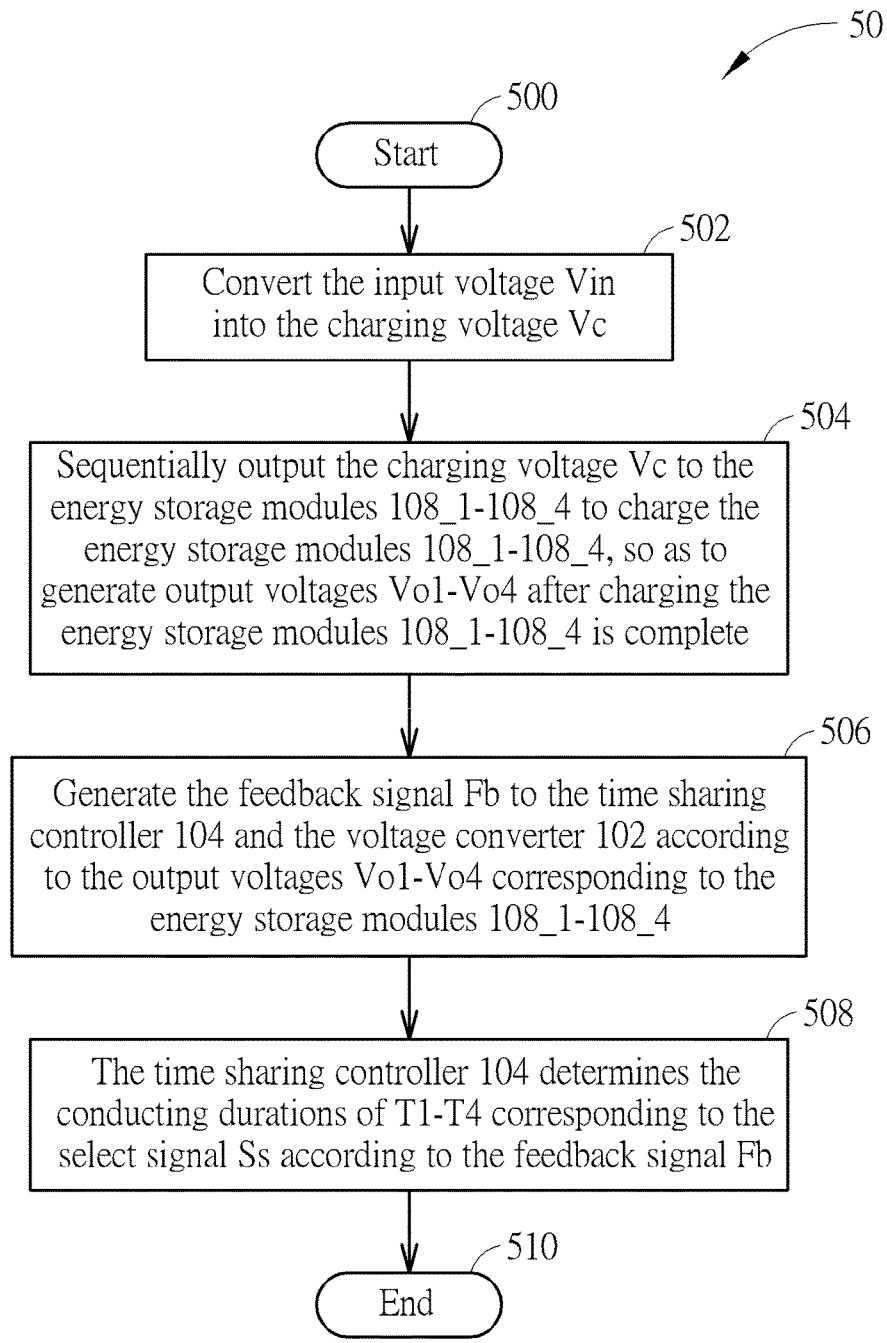
FIG. 5 is a schematic diagram of a process according to an embodiment of the present invention.

As to the operating principle of the voltage regulator 30, please refer to FIG. 5, FIG. 5 is a schematic diagram of a process 50 of the voltage regulator 30. The process 50 includes the following steps:

Step 500: Start.

Step 502: Convert the input voltage Vin into the charging voltage Vc.

Step 504: Sequentially output the charging voltage Vc to the energy storage modules 108_1-108_4 to charge the energy storage modules 108_1-108_4, so as to generate output voltages Vo1-Vo4 after charging the energy storage modules 108_1-108_4 is complete.

Step 506: Generate the feedback signal Fb to the time sharing controller 104 and the voltage converter 102 according to the output voltages Vo1-Vo4 corresponding to the energy storage modules 108_1-108_4.

Step 508: The time sharing controller 104 determines the conducting durations of T1-T4 corresponding to the select signal Ss according to the feedback signal Fb.

Step 510: End.

According to the process 50, the present invention is able to provide different output voltages Vo1-Vo4 based on the energy storage modules 108_1-108_4 of the voltage regulator 30. In Step 502, the voltage converter 102 converts the input voltage Vin into the charging voltage Vc. Then, in Step 504, the de-multiplexer 106 sequentially outputs the charging voltage Vc to the energy storage modules 108_1-108_4 to charge the energy storage modules 108_1-108_4. After charging the energy storage modules 108_1-108_4 is complete, the energy storage modules 108_1-108_4 generate output voltages Vo1-Vo4. In Step 506, the multiplexer 310 generates the feedback signal Fb according to the output voltages Vo1-Vo4 corresponding to the energy storage modules 108_1-108_4 and delivers the feedback signal Fb to the time sharing controller 104 and the voltage converter 102 to form the voltage regulating loop. In Step 508, the time sharing controller 104 determines the conducting durations of the T1-T4 corresponding to the energy storage modules 108_1-108_4 and the time sharing controller 104 according to the feedback signal Fb.

Notably, the embodiments mentioned in the above are utilized for illustrating the concept of the present invention. Those skilled in the art may make modifications and alterations accordingly, and not limited herein. For example, the voltage converter 102, the time sharing controller 104, the de-multiplexer 106 and the multiplexer 310 may be realized through a single integrated circuit (IC) package or the amount of the energy storage modules may increase or decrease according to the requirements of the computer system. Alternatively, it is possible to set multiple voltage converters 102, time sharing controllers 104, and multiple energy storage modules 108 to collaborate with each other to stably output voltage sources supplying each component of the computer system, which is within the scope of the present invention.

In summary, the present invention provides a voltage regulator and a control method to provide multiple output voltages for the computer device, so as to save the area from setting multiple voltage regulators on the printed circuit board (PCB), improve the usage efficiency of the PCB, and provide stable power sources for the computer device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage regulator, comprising:
   a plurality of energy storage modules;
   a voltage converter, for converting an input voltage into a charging voltage;
   a time sharing controller, for generating a select signal; and
   a de-multiplexer, coupled to the plurality of energy storage modules, the voltage converter and the time sharing controller, for sequentially conducting connections between each energy storage module of the plurality of energy storage modules and the voltage converter according to the select signal, to charge each energy storage module of the plurality of energy storage modules with the charging voltage, so as to generate the plurality of output voltages via the plurality of energy storage modules after charging each energy storage module of the plurality of energy storage modules is complete;
   wherein the select signal generated by the time sharing controller is related to at least one of conducting sequences and conducting durations of the plurality of energy storage modules and the voltage converter and of the plurality of energy storage modules and the time sharing controller.

2. The voltage regulator of claim 1, further comprising:
   a multiplexer, coupled to the plurality of energy storage modules and the time sharing controller, for sequentially conducting the connections between each energy storage module of the plurality of energy storage modules and the voltage converter according to the select signal, and sequentially converting each output voltage of the plurality of output voltages into a feedback signal and transmitting the feedback signal to the time sharing controller.

3. The voltage regulator of claim 1, wherein the conducting durations corresponding to the plurality of energy storage modules do not overlap.

4. The voltage regulator of claim 1, wherein the conducting durations corresponding to the plurality of energy storage modules are not completely the same.

5. The voltage regulator of claim 1, wherein the voltage converter determines the conducting durations corresponding to the select signal according to the feedback signal.

6. A control method, for a voltage regulator comprising a plurality of energy storage modules, the control method comprising:
   converting an input voltage into a charging voltage; and
   sequentially outputting the charging voltage to each energy storage module of the plurality of energy storage modules, to charge each energy storage module of the plurality of energy storage modules, so as to generate a plurality of output voltages after charging each energy storage module of the plurality of energy storage modules is complete;
   wherein the select signal is related to at least one of conducting sequences and the conducting durations of the plurality of energy storage modules.

7. The control method of claim 6, further comprising:
   generating a feedback signal for a time sharing controller according to the plurality of output voltages corresponding to the plurality of energy storage modules; and
   the time sharing controller determining conducting durations corresponding to the select signal according to the feedback signal.

8. The control method of claim 7, wherein the conducting durations corresponding to the plurality of energy storage modules do not overlap.

9. The control method of claim 7, wherein the conducting durations corresponding to the plurality of energy storage modules are not completely the same.

\* \* \* \* \*